United States Patent
Sanz Casado et al.

(10) Patent No.: US 10,358,768 B2
(45) Date of Patent: Jul. 23, 2019

(54) METHOD FOR MANUFACTURING LONG LASTING PHOSPHORESCENT FABRICS AND FABRICS OBTAINED FROM THE SAME

(71) Applicants: UNIVERSIDAD DE CANTABRIA, Santander (ES); TEXTIL SANTANDERINA, S.A., Santander (ES)

(72) Inventors: Juan Marcos Sanz Casado, Santander (ES); Rodrigo Alcaraz De La Osa, Santander (ES); Fernando Moreno Gracia, Santander (ES); Francisco González Fernández, Santander (ES); José Mariá Saiz Vega, Santander (ES); Bruno Aspeel, Santander (ES); Roberto González, Santander (ES); Vicente Martínez, Santander (ES)

(73) Assignees: UNIVERSIDAD DE CANTABRIA, Santander (ES); TEXTIL SANTANDERINA, S.A., Santander (ES)

( * ) Notice: Subject to any disclaimer, the term of this patent is extended or adjusted under 35 U.S.C. 154(b) by 0 days.

(21) Appl. No.: 15/312,137

(22) PCT Filed: Mar. 20, 2015

(86) PCT No.: PCT/ES2015/070198
§ 371 (c)(1),
(2) Date: Nov. 17, 2016

(87) PCT Pub. No.: WO2015/177386
PCT Pub. Date: Nov. 26, 2015

(65) Prior Publication Data
US 2017/0089008 A1     Mar. 30, 2017

(30) Foreign Application Priority Data

May 20, 2014   (ES) .................................. 201430741

(51) Int. Cl.
| | |
|---|---|
| *D06P 1/00* | (2006.01) |
| *C09K 11/77* | (2006.01) |
| *D06N 3/00* | (2006.01) |
| *C09K 11/02* | (2006.01) |
| *D06P 1/52* | (2006.01) |
| *A41D 13/01* | (2006.01) |
| *D06P 5/04* | (2006.01) |
| *A41D 31/04* | (2019.01) |
| *D06N 3/14* | (2006.01) |
| *A41D 31/32* | (2019.01) |

(52) U.S. Cl.
CPC ............ *D06P 1/0012* (2013.01); *A41D 13/01* (2013.01); *A41D 31/04* (2019.02); *C09K 11/02* (2013.01); *C09K 11/025* (2013.01); *C09K 11/7792* (2013.01); *D06N 3/0063* (2013.01); *D06P 1/5285* (2013.01); *D06P 5/04* (2013.01); *A41D 31/32* (2019.02); *A41D 2600/10* (2013.01); *A41D 2600/20* (2013.01); *D06N 3/14* (2013.01); *D06N 2209/0892* (2013.01)

(58) Field of Classification Search
CPC .............................. C09K 11/025; A41D 13/01
See application file for complete search history.

(56) References Cited

U.S. PATENT DOCUMENTS

| | | | | |
|---|---|---|---|---|
| 2002/0076534 A1* | 6/2002 | Sadato | ............... | A41D 31/0016 428/206 |
| 2003/0222247 A1* | 12/2003 | Putman | ..................... | A61K 8/87 252/301.36 |
| 2008/0155763 A1* | 7/2008 | Janssen | ..................... | D06B 3/10 8/444 |
| 2012/0006387 A1* | 1/2012 | Adachi | ..................... | B32B 7/12 136/251 |
| 2012/0246909 A1* | 10/2012 | Kobayashi | ............... | B44C 5/00 29/428 |
| 2013/0153118 A1* | 6/2013 | Friedrich | ................ | C03B 11/14 156/67 |
| 2016/0053172 A1* | 2/2016 | Mori | ........................ | F21K 2/04 252/301.36 |

* cited by examiner

*Primary Examiner* — Austin Murata
(74) *Attorney, Agent, or Firm* — Cantor Colburn LLP

(57) ABSTRACT

A method for manufacturing long lasting phosphorescent fabrics and articles of clothing including fabric for use in fields such as security, domestic, sports, health, professional, etc., includes (i) preparing a composition for dyeing having a strontium aluminate pigment doped with europium and dysprosium; (ii) coating a starting fabric with the composition by air knife coating or cylinder; (iii) drying; and (iv) polymerizing. The fabrics thus obtained have long lasting phosphorescent properties and a high resistance to washing, maintaining the factory specifications of the starting fabric with respect to its mechanical properties, comfort, breathability and/or high visibility properties, if relevant.

13 Claims, 1 Drawing Sheet

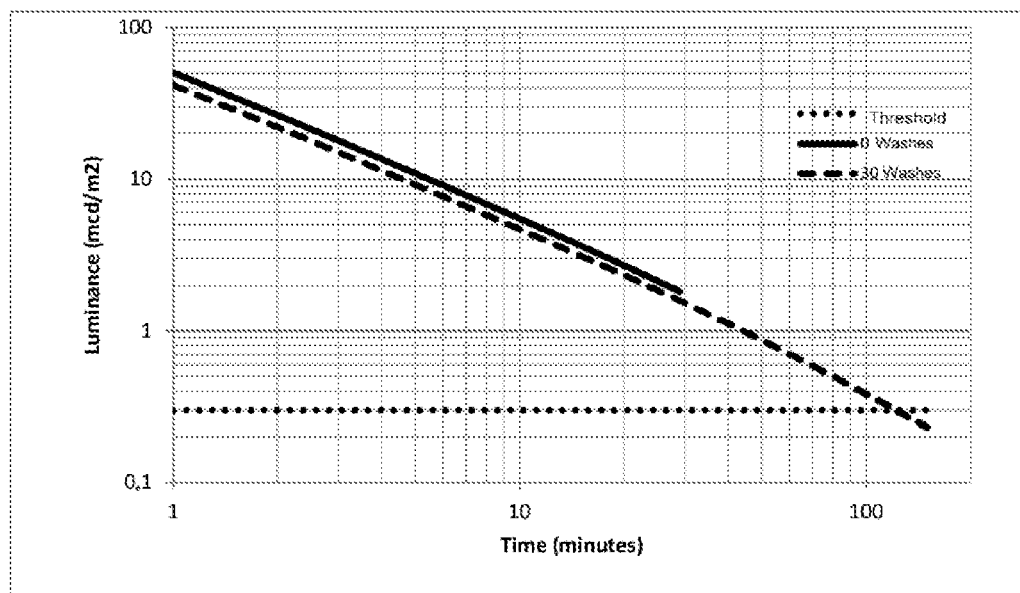

METHOD FOR MANUFACTURING LONG LASTING PHOSPHORESCENT FABRICS AND FABRICS OBTAINED FROM THE SAME

TECHNICAL FIELD

The present disclosure falls within the sector of phosphorescent fabrics for use in fields such as security, domestic, sports, health, professional, etc., and in particular it is related to a new method for manufacturing long lasting phosphorescent fabrics, and to the fabrics obtained for use in the above fields.

BACKGROUND

The current process for manufacturing fabrics with phosphorescent properties for use in various fields is conventionally carried out by producing them with phosphorescent yarn or by adding phosphorescent patches to provide phosphorescence to the fabric. The components are applied in the fabric in the fiber itself (FR 2909096, KR20010016536, WO03002794, WO2006100175), by the application of heat adhesive or sewn photoluminescent patches made from these fibers, or by a coating slurry (CN102154824, KR20120041887) to allow good phosphorescence properties. However, these manufacturing methods have some disadvantages such as loss of good feel of the fabric and adequate flexibility, thus the loss of fabric comfort, and breathability.

Moreover, with these conventional manufacturing methods the typical times of phosphorescence decay in the fabric are not controlled, and the strength of the same is not proven or is relatively low compared to the strength shown by a fabric to which any other conventional textile dye has been applied (disperse, direct, acid, basic, reactive, vat . . . ). In this sense, the resistance of these fabrics to washing is reduced (in some cases they do not resist the first wash) and phosphorescence typically disappears after a few washes making the fabric unusable for the initial purpose.

In view of the above there remains a need in the state of the art to provide phosphorescent fabrics with improved properties, in particular, long lasting phosphorescent fabrics, i.e. that maintain the phosphorescent properties for a long time in a controlled manner, and that also maintain the mechanical, comfort and breathability features of the base fabric, and phosphorescence after repeated washes thereby extending the life of the fabric and the article of clothing made with it.

BRIEF DESCRIPTION OF THE DRAWINGS

FIG. 1: Depicts the attenuation of the luminance (tncd/m$^2$) as a function of the elapsed time (minutes) after the cessation of stimulation of a long lasting phosphorescent fabric according to Example 1 of the present disclosure. The line parallel to the X axis represents the threshold of the human eye adapted to darkness according to the standard UNE23035.

DETAILED DESCRIPTION OF THE DRAWINGS

In a first aspect the disclosure is related to a method for manufacturing a long lasting phosphorescent fabric with high strength.

The method of the disclosure can be implemented with any type of fabric, without there being any limitation in this regard. The fabric may thus be a textile fabric or a non-woven fabric, made from any "greige" (name used for raw fabrics without any process, such as when they leave the loom) and/or weave, made of any type of natural, artificial or synthetic fiber, or mixtures of fibers, by any conventional process.

In a particular embodiment the fabric is selected from polyester, cotton and cotton-polyester blend. In a particular embodiment the fabric has previously been chemically bleached and/or mercerized. In a preferred embodiment the fabric has high visibility in accordance with the standard ISO 20471:2013. The high visibility of a fabric requires that it be steadily lit to emit visible light. In this regard, the inventors have surprisingly discovered that the method of the disclosure carried out on a high visibility fabric, and in particular when visibility is yellow, leads to no decrease in the brightness properties of the starting fabric. Therefore, it is possible to manufacture a high visibility fabric in accordance with the standard ISO 20471:2013, and preferably yellow, and at the same time with long lasting phosphorescence.

The method of the disclosure comprises the following stages:
 a) Preparing a composition for dyeing comprising a strontium aluminate pigment doped with europium and dysprosium,
 b) Coating the starting fabric with said composition by air knife coating or cylinder,
 c) Drying, and
 d) Polymerizing The pigment useful for implementing the disclosure is strontium aluminate doped with europium and dysprosium. The pigment for preparing the composition for dyeing must be in powder form, where the particles have a size between 1 and 100 microns. Preferably the particles have a d50 between 10 and 20 microns or d90<30 microns. The particle size is important in that it must be large enough to ensure that it produces phosphorescence and small enough to achieve its firm attachment to the fabric. Prior to its use, the pigment particles are preferably encapsulated to protect them from further contact, for example, with the components of the composition for dyeing or with external agents such as water, detergents, etc. Encapsulation can be done a priori by conventional methods, using starting compounds capable of generating a coating on the particles and that are transparent or translucent in the visible-UV, such as $SiO_2$, $TiO_2$, $ZrO_2$, $Al_2O_3$, among others, and mixtures thereof. The encapsulation leads to a fine coating of the particle which increases the particle size and decreases pigment phosphorescence. The inventors have observed that although the coating attenuates the passage of radiation there through, it is compensated by improved fixation of the pigment to the fabric. In a particular embodiment the coating of the particle is $SiO_2$. This may be obtained, for example, conventionally by contacting the particles with ethyl orthosilicate, in an alcoholic acidic solution, and then drying the resulting mixture.

The composition for dyeing comprises in addition to the pigment, a base paste and a fixative. In a particular embodiment the composition comprises between 1% and 30% of the pigment, between 40% and 98% of the base paste and between 1% and 30% of the fixative where the percentages refer to weight percentages with respect to the total weight of the base paste, the fixative and the pigment.

In a preferred embodiment the composition for dyeing comprises between 8% and 20% of pigment, more preferably between 10% and 15%.

The base paste in a particular embodiment comprises an aqueous suspension of polyurethane (PU). In a particular embodiment the fixative is a composition based on melamine-formaldehyde resin.

The composition for dyeing also comprises a thickener comprising polyacrylic acid in an amount between 1 g and 99 g per kg of base paste, fixative and pigment. The inventors of the present disclosure have observed that the presence of thickener gives the composition for dyeing a viscosity between 3 Pa·sec and 8 Pa·sec measured at 20° C. which is very suitable to make the fabrics provided by the present disclosure have a resistance to washing of at least 30 washes and attenuation times at or above 120 minutes. The pH value is also controlled to keep it above about 5.5 which is also important to achieve the desired results. Likewise, the base paste is inert to the pigment such that it does not alter it and enables the pigment particles to adhere to fabric.

The coating of the fabric is carried out by stamping techniques, by air knife coating or cylinder using a conventional apparatus for this purpose. In a preferred embodiment it is carried out by air knife coating. Then, it is proceeded to the drying of the composition for dyeing at temperatures comprised between 120° C. and 150° C. The drying time is variable; typically of between 20 sec and 120 sec but it depends on other parameters of the process: such as the composition for dyeing, the type of fabric, etc. Then the polymerization takes place, where the previously dried fabric is subjected to temperatures of between 150° C. and 180° C. The polymerization time is also variable; typically from 30 sec to 180 sec. In a particular embodiment the drying and the polymerization occur simultaneously. In a particular embodiment the polymerization is performed by applying consecutive thermal cycles at temperatures between 150° C. and 180° C. Generally, each of the cycles has a duration between 5 sec and 30 sec. In a particular embodiment the drying and polymerizing are carried out in 6 cycles at successive temperatures of 120° C., 140° C., 170° C., 170° C., 170° C. and 170° C.

The resulting fabric has a pigment density, that is, an amount of pigment per fabric surface unit that is variable depending on the amount of thickener used, the height of the scraper, the inclination of the scraper, the starting fabric, the conditions of the method, etc. In a particular embodiment the amount is comprised between 0.1 $g/m^2$ and 1000 $g/m^2$, preferably between 1 and 100 $g/m^2$, and more preferably between 1 and 40 $g/m^2$. In a particular embodiment for a pigment concentration of 15% by weight with respect to the total weight of base paste, fixative and pigment, the resulting density of pigment is 30 $g/m^2$.

The method of the disclosure may also comprise one or more additional stages of finishing treatment. These stages are generally referred to any conventional process of finishing treatment to which the fabrics are usually subjected. Examples of said finishing treatments are "air knife coating" with acrylates to provide strength and rigidity to the fabric; treatment with a softener applied by padding bath to confer the fabric a soft, elastic, and hydrophilizing touch, such as, for example, by applying a quaternized silicone polymer nanoemulsion modified with nonionic emulsifiers; Teflon-type waterproofing treatment with polytetrafluoroethylene (PTFE); anti-stain treatment; antacid treatment; the application of permanent press finishing by padding bath; sanforizing, a treatment comprising washing and pressing to prevent the fabric from shrinking subsequently or calendering, applying temperatures and pressures, for example in cold temperature at 30° C.

In another aspect, the disclosure relates to the long lasting phosphorescent fabric obtained by the method of the disclosure intention.

The fabric has many advantages, notable here being the long lasting phosphorescence which in the context of the present disclosure refers to the fact that the attenuation time after the fabric is subjected to the action of a light source in the UV range is equal to or greater than 120 minutes, preferably equal to or greater than 130 min, more preferably equal to or greater than 140 min and even more preferably equal to or greater than 150 min. Attenuation time means the time during which the fabric, due to the light emission of its excited particles, is visible to the human eye adapted to the darkness after the cessation of the light stimulus impinging on the fabric. The long lasting phosphorescence can therefore occur in the fabric when desired, within said period of attenuation, once the fabric has been stimulated with UV light.

In a preferred embodiment the fabric of the disclosure is a high visibility and long lasting phosphorescence fabric. The inventors have found in this sense that the properties of high visibility in accordance with the standard ISO 20471: 2013 remain in the resulting fabric; also, the starting color is not modified after subjecting the fabric to the method of the disclosure, and the long lasting phosphorescence property is further achieved. Therefore, the resulting fabric has the ability to emit light when it is subjected to constant light stimulus, that is, at times of very short duration, and the ability to emit long lasting phosphorescence in the absence of light stimulus.

A further advantage of the fabric of the disclosure is that it can be subjected to various finishing treatments, for modifying or adding certain properties to the fabric, and it does not lose its long lasting phosphorescence properties.

Additionally, the starting fabrics keep their mechanical properties of good touch, flexibility, comfort and breathability and keep their thermal features after implementing the method of the disclosure. Regarding the strength to light of the starting fabric, it is even possible to expect an improvement since the pigments which are incorporated absorb the UV radiation, preventing at least part of said radiation to deteriorate the fabric.

As for the strength against washes, attenuation times equal to or greater than 120 min are achieved after 30 washes, following the protocol described below. These times are obtained after at least 30 washes of the article of clothing, following the protocol that is described below; typically these are equal or greater, the smaller the number of washes.

Finally, the possibility of applying phosphorescent properties to a fabric by the process object of the disclosure has additional economic advantages, since the same base fabric can be used as in any other dyeing process.

The fabric of the disclosure finds application in various fields such as security, domestic, sports, health, or others. It can therefore be used for the manufacture of any type of article without limitation. In particular, it is used to make articles of clothing for use in these areas, for example, so in another aspect the present disclosure provides an article of clothing comprising a fabric according to the present disclosure. Examples of said articles of clothing are jackets, overalls, aprons, gowns, sportswear, etc., and they have the same mechanical and thermal properties mentioned above for the fabric.

EXAMPLES

Example 1: Method for Manufacturing a Cotton Fabric with Long Lasting Phosphorescence It was carried out with a chemically bleached and mercerized cotton fabric (standard treatment of the cotton fibers with sodium hydroxide to alter the chemical structure of the fiber, converting the initial cellulose-alpha in a polymorphic structure of cellulose-beta, increasing the total surface of the fiber and its reflectance, providing it with more shine and a softer feel). The composition for dyeing was prepared using as base paste 87% of a polyurethane based aqueous suspension (Tubicoat FBWW, CHT Bezema); 3% of a melamine-formaldehyde resin as fixative (Tubicoat Fixierer HT, CHT Bezema); and 10% of strontium aluminate doped with europium and dysprosium, coated with a $SiO_2$ protective layer (grain sizes 1-100 µm—in the present example d95<30 µm) (MHG-6EW, ZHEJIANG MINHUI LUMINOUS TECHNOLOGY CO., LTD). The composition for dyeing also comprised 12 g per kg of the total of the above components, of a polyacrylic acid based thickener (aqueous solution of ammonium acrylate dispersed in isoparaffin with surfactants, petroleum distillates—hydrotreated light fraction—10-25%, anhydrous ammonia <0.5%, residual monomers MAK<1%), (Tubicoat Verdicker LP, CHT Bezema). The composition for dyeing for the application had an approximate viscosity of 6 Pas (relative humidity between 70% and 80% and room temperature 20° C.; Viscometer HAAKE VT-02).

The composition was applied by means of air knife-coating and then the fabric was subjected to drying and polymerizing in a RAME machine (machine used in the finishing of the fabrics, to widen them and correct the distortions of the weave). For this purpose, the following thermal cycle was applied: 12 sec at 130° C., 12 sec at 155° C., 12 sec at 170° C., 12 sec at 170° C., and 12 sec at 170° C.

Then the long lasting phosphorescence characteristics of the fabric obtained were determined, and are shown in FIG. 1.

In order to determine the strength of the fabric of the disclosure against washes the following experimental protocol was followed (based on the standards DIN 67510, UNE 23035 and ISO 16069, designed for emergency signs with no direct equivalent in the textile industry):

Lighting: Xenon arc lamp 150 W.
Sample position: at such a distance that the illuminance at the center of the sample and at four points equidistant from the center of the same (3 cm) is 1000+30 lux.
Lighting time: 5 min.
Luminance measurements L (mcd/m2) every minute after the cessation of the illumination, for a total of 30 min.
Used detector 'LMT B520 L' with the measuring head of 5 cm diameter in contact with the sample.
Calculation of the attenuation time: a quadratic regression is performed between minute 10 and minute 30 according to the following equation (luminance in mcd/m2 and time in minutes):

$$Log(L) = a \cdot log(t)^2 + b \cdot log(t) + c$$

where t is the time elapsed since the cessation of the illumination. After obtaining the values of a, b and c the value of the attenuation time is obtained, t_atten, by extrapolating the equation obtained to the luminance threshold value for the human eye adapted to darkness ($L_{threshold}$=0.3 mcd/m$^2$).

The washes were performed according to the program 6A in accordance with the standard UNE-EN ISO 6330:2012: 15 minutes wash at 40° C. without detergent and with a load of more than 3 kg, followed by three rinses with a duration of 3 minutes, 2 minutes and 2 minutes, and air drying.

The Table 1 below shows the results of a test of the attenuation time and the luminance 10 minutes after cessation of stimulation of a fabric according to the disclosure (example of embodiment 1) after a number of washes of zero and one:

|  | Number of washes | |
| --- | --- | --- |
|  | 0 | 1 |
| Attenuation time with the fabric of the disclosure (real time) | 138 min | 132 min |
| Luminances (10 min after cessation of stimulation) with the fabric of the disclosure | 5.5 mcd/m$^2$ | 5.5 mcd/m$^2$ |

Additionally, the strength against washes is demonstrated by the tests shown in the following table, in which the luminances and times to reach the luminance value of 0.3 mcd/m$^2$ have been measured in accordance with the standard UNE23035 and the like—DIN 67510 or ISO 16069—(threshold value of the human eye adapted to darkness; the attenuation time in this case is real following the cessation of the stimulation—5 min Xe lamp, 1000 Lux—that is, the one measured without estimation until the luminance of the sample reaches the threshold value). Table 2 below shows the results:

| | Number of washes | | | |
| --- | --- | --- | --- | --- |
| Results | 0 | 1 | 10 | 30 |
| Long Lasting Photo-luminescent Fabric of the disclosure | t_atten = 138 min L(10 min) = 5.5 mcd/m2 | t_atten = 132 min L(10 min) = 5.5 mcd/m2 | t_atten = 129 min L(10 min) = 5.2 mcd/m2 | t_atten = 125 min L(10 min) = 4.7 mcd/m2 |

The disclosure is not limited to the specific embodiments that have been described but it also covers, for example, the variants that can be performed by the person having ordinary skill in the art within what can be derived from the claims.

The invention claimed is:

1. A method for obtaining a long lasting phosphorescent fabric comprising the following steps:
   a) Preparing a composition for dyeing having a strontium aluminate pigment doped with europium and dysprosium,
   b) Coating a starting fabric with said composition by air knife coating or cylinder,
   c) Drying the fabric, and
   d) Polymerizing the fabric by applying consecutive thermal cycles at temperatures between 150° C. and 180° C., wherein drying and polymerizing are carried out in six cycles at successive temperatures of 120° C., 140° C., 170° C., 170° C., 170° C. and 170° C.

2. The method according to claim 1, wherein the pigment is used in powder form, and where the particles of the powder have a size comprised between 1 and 100 microns.

3. The method according to claim 1, wherein the particles of the pigment have a d50 between 10 and 20 microns.

4. The method according to claim 3, where the particles of the pigment are encapsulated by coating them with a translucent or transparent material in the visible-UV range.

5. The method according to claim 4, where the translucent or transparent material is $SiO_2$.

6. The method according to claim 1, wherein the particles of the pigment have a d90<30 microns.

7. The method according to claim 1, wherein the composition for dyeing comprises between 1% and 30%, by weight of pigment, between 40% and 98% by weight of a base paste and between 1% and 30% by weight of a fixative, where the base paste comprises an aqueous suspension of polyurethane and the fixative is a composition based on melamine-formaldehyde resin, and where the percentages are expressed by weight with respect to the total weight of base paste, fixative and pigment.

8. The method according to claim 7, wherein the composition for dyeing also comprises a thickener comprising polyacrylic acid in an amount comprised between 1 g and 99 g per kg of base paste, fixative and pigment.

9. The method according to claim 1, wherein the composition for dyeing has a viscosity between 3 Pas and 8 Pas at 20° C. and a pH value greater than 5.5.

10. The method according to claim 1, wherein the coating of the starting fabric is carried out by air knife coating.

11. The method according to claim 1, also comprising one or more stages of finishing treatment, wherein the finishing treatment is a by air knife coating with acrylates; treatment with softener applied by padding bath; a waterproofing treatment; an anti-stain treatment; an antacid treatment; the application of permanent press finishing by padding bath; sanforizing; or calendering.

12. The method according to claim 1, wherein the fabric is selected from cotton, polyester and cotton-polyester blend.

13. The method according to claim 1, wherein the fabric is high visibility fabric in accordance with the standard ISO 20471:2013.

* * * * *